US006481779B1

(12) United States Patent
Gothier et al.

(10) Patent No.: US 6,481,779 B1
(45) Date of Patent: Nov. 19, 2002

(54) RETRACTABLE TARP COVER SYSTEM FOR CONTAINERS

(75) Inventors: Richard Gothier, Higley, AZ (US); James R. Tuerk, Indianapolis, IN (US); Steven A. Henning, Anderson, IN (US); Robert E. Templin, Chandler, AZ (US); Oliver L. Allen, II, Streetsboro, OH (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 09/974,488

(22) Filed: Oct. 10, 2001

(51) Int. Cl.[7] .................................................. B60P 7/02
(52) U.S. Cl. .............................. 296/100.13; 296/100.12; 296/105
(58) Field of Search ........................... 296/100.13, 105, 296/100.12, 100.11, 100.01; 242/361.3, 361.4; 104/167

(56) References Cited

U.S. PATENT DOCUMENTS

| | | | | |
|---|---|---|---|---|
| 1,627,716 A | * | 5/1927 | Teachout | 296/105 |
| 1,827,059 A | * | 10/1931 | Woolcott | 296/105 |
| 2,406,737 A | * | 9/1946 | Bramble | 296/105 |
| 2,469,958 A | * | 5/1949 | Fowler | 296/105 |
| 2,807,499 A | * | 9/1957 | Duddleston | 296/100.12 |
| 3,481,645 A | * | 12/1969 | Strepp | 296/105 |
| 4,067,603 A | * | 1/1978 | Fenton | 296/100.13 |
| 4,189,178 A | * | 2/1980 | Cramaro | 296/100.12 |
| 4,285,539 A | * | 8/1981 | Cole | 296/100.12 |
| 4,725,090 A | * | 2/1988 | Weaver | 296/100.11 |
| 4,801,171 A | * | 1/1989 | Weaver | 296/100.11 |
| 4,995,663 A | * | 2/1991 | Weaver | 296/100.11 |
| 5,026,109 A | * | 6/1991 | Merlot, Jr. | 296/105 |
| 5,102,182 A | * | 4/1992 | Haddad, Jr. | 296/100.13 |
| 5,145,230 A | * | 9/1992 | Biancale | 296/100.13 |
| 5,240,303 A | * | 8/1993 | Hageman | 296/100.12 |
| 5,253,914 A | * | 10/1993 | Biancale | 296/100.13 |
| 5,354,113 A | * | 10/1994 | Pettersson | 296/100.12 |
| 5,429,408 A | * | 7/1995 | Henning et al. | 296/100.12 |
| 5,713,712 A | * | 2/1998 | McIntyre | 296/100.12 |
| 6,139,085 A | * | 10/2000 | Templin et al. | 296/100.13 |
| 6,142,554 A | * | 11/2000 | Carroll et al. | 296/100.13 |
| 6,220,646 B1 | * | 4/2001 | Lamela et al. | 296/100.12 |
| 6,250,233 B1 | * | 6/2001 | Luckring | 296/100.01 |

FOREIGN PATENT DOCUMENTS

| | | |
|---|---|---|
| EP | 0 027 102 A1 * | 10/1980 |
| GB | 2 074 511 A1 * | 4/1981 |

OTHER PUBLICATIONS

"Easy Pull Tarping System" and "Easy Pull Heap Hopper" catalog brochure, 4 pages. 1999 Aero Industries, Inc.
"Easy Cover Tarping System" catalog brochure, 8 pages. 1999 Aero Industries, Inc.
"Easy Pull Tarping System", catalog sheet. 1999 Aero Industries, Inc.
"Easy Cover Economy Dump Tarping System", catalog sheet. 1999 Aero Industries, Inc.

* cited by examiner

Primary Examiner—Kiran Patel
(74) Attorney, Agent, or Firm—Maginot, Moore, and Bowman LLP

(57) ABSTRACT

An endless cable tarp extension/retraction system spooled around front and rear pulleys includes drive components that are self-contained and encapsulated within an elongated housing that can be removably mounted to the container body using multiple clamp assemblies or mounting bolts disposed within a T-slot in the housing. A front idler pulley is provided that is sized and oriented relative to the drive pulley to maintain the upper and lower runs of the cable to travel essentially parallel along the length of the container. A self-tensioning rear idler pulley is provided that utilizes a spring to exert an adjustable force against the rear idler pulley. In another aspect of the invention, an anti-sail bracket extends downward from the bow ends of the tarp system and includes an inwardly projecting pin that is restrained from upward movement by a rail mounted to the side of the container.

13 Claims, 6 Drawing Sheets

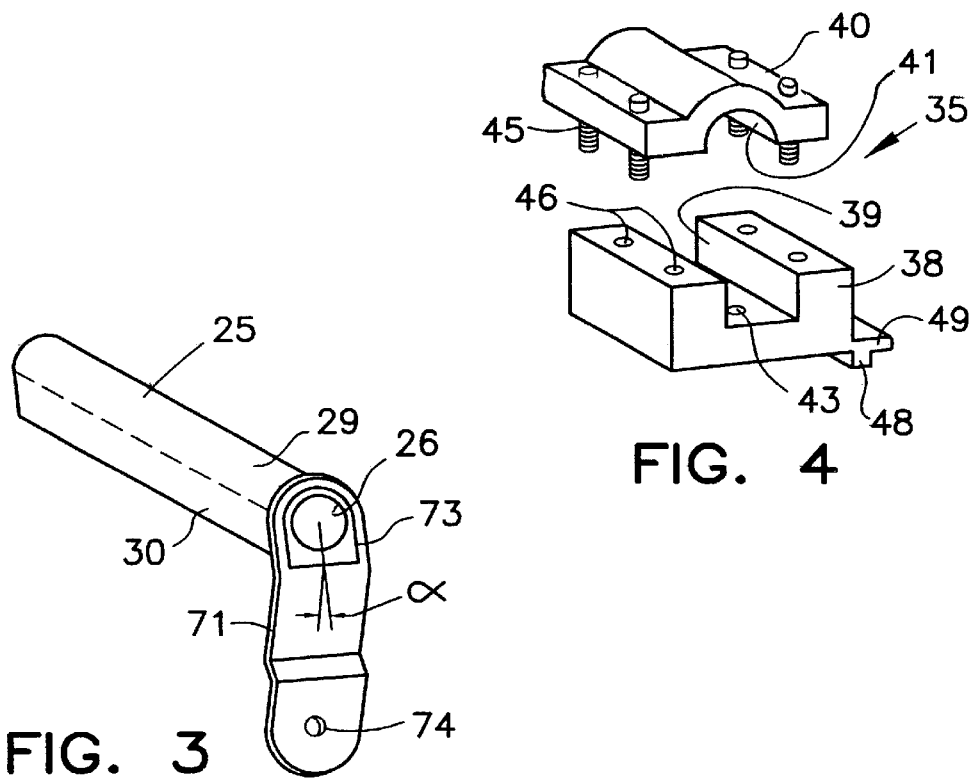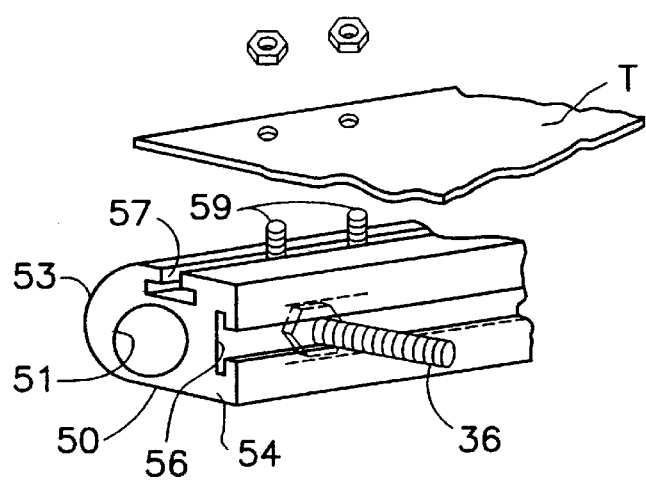

RETRACTABLE TARP COVER SYSTEM FOR CONTAINERS

BACKGROUND OF THE INVENTION

The present invention concerns improvements to retractable and extendable tarp cover systems for open-topped containers. The invention has particular application to vehicle-mounted containers, such as dump trucks. More particularly, the improvements relate to a tarp cover system utilizing an endless cable for extending or retracting the tarp along the length of the open-topped container.

It is well known to provide tarp cover systems for containers that utilize tarps having transversely extending bows. The bows support the tarp cover and are typically curved to accommodate heaped loads within the container body.

One such system is described in U.S. Pat. No. 5,429,408, owned by the Assignee of the present invention. In this tarp cover system, an endless cable extends along the length of the container on both sides of the container. The cover tarp includes transverse bows that terminate at bow ends, in which the bow ends are configured to slide along the endless cable. The rear-most bow end is directly connected to the cable so that as the cable is circulated between front and rear pulley systems, the cable carries the connected bow end with it. As the rear-most bow end travels along the length of the container, the tarp is gradually placed in tension and each successive bow end slides along the endless cable toward its fully deployed or retracted position. In this way, and as described in more detail in the '408 patent, the tarp cover can be extended or retracted.

In a typical endless type cable system, such as the one disclosed in the '408 patent, a pulley system supports the cable at opposite ends of the container body. One end of the pulley system is a driven end, and can either be manually or electrically driven. In a typical application, a hand crank is connected by way of a chain drive and sprocket to the driven pulley so that the tarp cover can be readily manually extended or retracted.

One drawback with the cable/pulley systems of the prior art is that the drive components are exposed at the front end of the container. In addition to the unsightly appearance of these components, the drive mechanisms are susceptible to fouling and deterioration, such as through rusting.

A further drawback has been that the endless cable has a tendency to stretch over time. As the cable stretches, the friction between the cable and pulleys decreases until it reaches a point at which rotation of the drive pulley can no longer circulate the cable. Moreover, if the cable stretches enough, it can become disengaged from the pulleys.

Yet another difficulty inherent in the endless cable systems is that the tarp and bows have a tendency to "sail" or flare upward due to airflow or road vibrations. When the tarp sails, the contents within the container can spill out or can become wet in rainy conditions.

SUMMARY OF THE INVENTION

These and other detriments and difficulties with the prior art endless cable systems are addressed by the present invention. In certain aspects, the invention presents improvements to a retraction/extension system for a tarping system of the type utilizing transverse bows, traveling along endless cable assemblies on either side of the container body.

In one aspect of the invention, the tarping system includes an encapsulated drive mechanism for circulating the endless cable between pulley systems at opposite ends of the container. In the preferred embodiment, a drive axle is provided carrying drive pulleys at its opposite ends that are configured to be traversed by, and actually drive, the endless cable. A drive member is also connected to at least one end of the drive axle. The present invention contemplates a drive member of a variety of types, such as a chain and sprocket arrangement that can be either manually, mechanically, or electrically powered.

The invention contemplates encapsulating the drive axle within an elongated housing that is sized to cover most of the axle. Most preferably, the entire axle is concealed except for portions carrying the drive pulleys and drive member (such as a sprocket). The axle can be supported at the ends of the housing by a pair of bearing elements, such as a bushing or a bearing assembly.

In a further feature of the invention, the elongated housing can be provided in a fully assembled condition, with the axle, pulley and drive components all supported by the housing. The housing can then be mounted to a front panel or top rail of the container using a means for removably mounting. In one embodiment, the means for removably mounting can include a clamp assembly that includes a base clamp half and an upper clamp half. The base clamp half defines a channel for receiving at least a portion of the housing therein. The upper clamp half can be bolted onto the base clamp half to close the channel and trap the housing within the clamp.

In a preferred embodiment, the base clamp half defines holes for receiving mounting bolts therethrough. The bolts can pass through appropriately aligned bolt holes formed in the container panel or top rail and nuts can be threaded onto the ends of the bolts to mount the base clamp half onto the container. At least two clamp assemblies are mounted to the container, preferably at opposite sides. The self-contained housing and cable drive component assembly can then be positioned within the aligned base clamp halves and the corresponding upper clamp halves bolted onto the base clamp halves to fix the assembly to the container.

In another embodiment, the means for removably mounting the housing can be incorporated into the housing itself. In this embodiment, the housing includes a mounting surface that abuts the container body for mounting. The mounting surface defines a T-shaped slot along the length of the housing. Mounting bolts are provided having a head configured for non-rotating slidable movement within the T-shaped slot. With this aspect of the invention, the housing can be mounted to the container at an infinite number of locations.

In a most preferred embodiment, the elongated housing has an irregular shape, such as a D-shape. The channel in the base clamp half can be configured to accept the flat end of the D-shape, while the upper clamp half can define a curved channel corresponding to the curved portion of the D-shape. This irregular shape can prevent rotation of the housing as the drive axle rotates. In addition, the shape facilitates supporting the housing within the base clamp halves when they are mounted onto the container body, and until the upper clamp halves can be bolted down.

In another aspect of the invention, the cable drive mechanism includes an idler pulley arrangement at the drive pulley end. An idler pulley can be associated with each drive pulley on either side of the container. Preferably, the idler pulley is supported by an idler bracket mounted to the housing. In one feature, the idler pulley has a diameter that is significantly less than the diameter of the drive pulley. Moreover, the idler bracket is oriented to that the idler pulley is positioned relative to the drive pulley so the portions of the endless cable exiting each pulley is substantially parallel. This parallel orientation of the upper and lower traverses of the cable improves the driving force imparted to the tarp bows and reduces the envelope occupied by the cable drive system.

Another feature of the invention contemplates a self-adjusting rear idler pulley system that accounts for stretching of the cable over time or temporarily. With this feature, a rear idler pulley is carried by a yoke. The yoke is preferably telescopically mounted within a cylinder mounted to the container body. One end of the cylinder is closed, while the other end is open to receive the yoke in telescopic engagement. A spring is disposed between the closed end of the cylinder and the end of the yoke. In the preferred embodiment, the spring is a compression spring that exerts a force tending to push the yoke out of the cylinder. A pin mounted on the yoke extends through an elongated slot to limit the relative axial movement between the yoke and the cylinder.

In another feature of this embodiment of the invention, the pin has a diameter that is substantially less than the width of the slot in the cylinder. This dimensional difference allows the yoke to rotate to a limited extent relative to the cylinder. More particularly, this relative rotation capability can eliminate excessive load on the endless cable as the tarp cover is deployed or retracted.

Most preferably, the force generated by the compression spring can be adjusted by adjusting the height, or amount of compression, of the spring. This in accordance with a further aspect of the invention, a plunger is disposed between the closed end of the cylinder and the spring. A screw can be threaded into a cap at the closed end of the cylinder so that the screw bears against the plunger. The screw can be used to adjust the position of the plunger within the cylinder, which ultimately increases or decreases the degree of compression of the spring, and ultimately increases or decreases the amount of force applied to the yoke and idler pulley.

The invention further contemplates an anti-sail apparatus for a tarping system for an open-topped container. The tarping system includes a tarp cover supported by a plurality of bows, the opposite ends of the bows being carried by an endless cable extending along the length of the container. The anti-sail apparatus can comprise a rail attached to the container along a side rail of the container. The rail includes a ledge projecting outward from the container.

The anti-sail apparatus further includes a bracket connectable to the opposite ends of substantially all of the bows. The brackets include a portion extending downward from the bow end adjacent the ledge. In accordance with the invention, the apparatus includes a projection, such as a pin, extending from the downward portion of the bracket so that the pin is situated underneath the ledge. In other words, the ledge is disposed between the projection and the bow end so that as the bow end lifts, the projection or pin contacts the ledge of the rail to prevent further upward movement.

One object of the present invention is to improve the cable-driven tarp retraction and extension system. A further object is to do so in a somewhat modular approach to facilitate assembly of the system, particularly of the drive components of the system.

A further object is to enhance the drive capabilities of the endless cable system, most particularly by eliminating the effects of cable stretching. Still another object resides in features of the invention configured to prevent sailing of the tarp cover. These and other objects and benefits of the invention can be discerned from the following written description taken together with the accompanying figures.

DESCRIPTION OF THE FIGURES

FIG. 3 is a side perspective view of a housing and idler bracket component of the extension system illustrated in FIG. 2.

FIG. 4 is a side perspective view of mounting clamps in accordance with one embodiment of the present invention for mounting a housing, as shown in FIG. 3, to the body of the container.

FIG. 5 is a rear perspective view of an alternative embodiment of a housing for use with the extension system shown in FIGS. 1 and 2.

DESCRIPTION OF THE PREFERRED EMBODIMENTS

Figure 1:
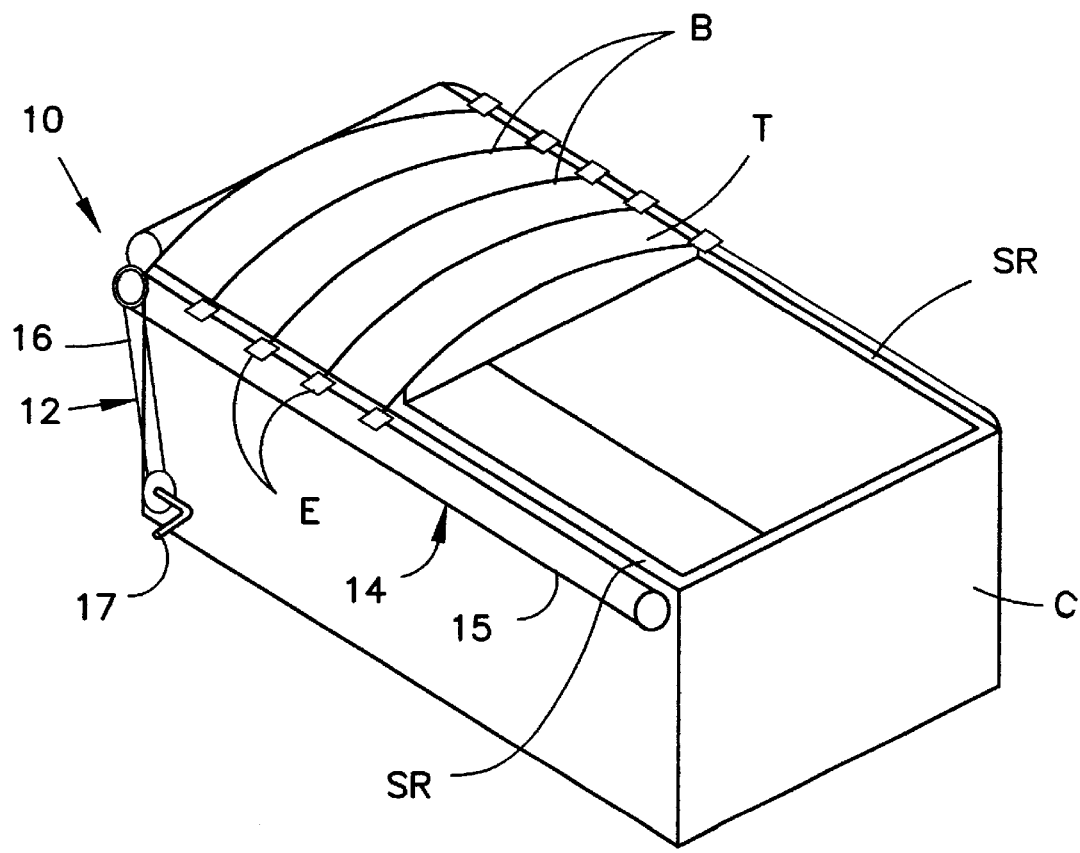
FIG. 1 is a top perspective view of an open-topped container having an extendable/retractable tarp cover system mounted thereon.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

FIG. 1 illustrates an open-topped container having a tarp cover system of the type generally contemplated within the present invention. Specifically, a container C can include a tarp cover T that is configured to be deployed along the side rails SR of the container C. The tarp cover T is supported by a plurality of curved bows B that span the width of the container C. Each of the bows B terminates in a bow end E that is configured to engage an endless cable mechanism 14 of an extension system 10. The extension system 10 includes a drive mechanism 12 that can be in the form of a drive chain 16 and manual crank 17. The drive mechanism 12 causes circulation of the endless cable 15 along the length of the side rail SR. The bow ends E of the tarp cover T are engaged to the cable 15 so that movement of the cable causes commensurate extension or retraction of the tarp cover T.

The present invention contemplates an extension system 10 that can be configured in the manner illustrated in the above-mentioned U.S. Pat. No. 5,429,408. The details of this retractable tarp cover system can be gleaned from the '408 patent, the disclosure of which is incorporated herein by reference. The preferred embodiment of the prevent invention, contemplates modifications to the retraction/extension system disclosed in the '408 patent.

Thus, in accordance with one feature of the invention, the extension system 10 includes a drive mechanism 12 as shown in FIG. 1. Referring to the more detailed view of FIG. 2, the drive mechanism 12 can include a sprocket 19 affixed to a drive axle 21 that is sized to span the width of the container C. In one embodiment, a mounting hub 22 can be provided to fasten the sprocket 19 and other rotating components directly to the ends of the drive axle 21.

In the system described in the '408 patent, as with other systems of the prior art, the drive axle is exposed across its entire length. Of course, any exposed working components are more susceptible to fouling and deterioration. Moreover, the exposed mechanisms can generate unnecessary drag as the vehicle-mounted container travels down the road. Finally, the exposed components can detract from a desired esthetic appearance.

Consequently, the present invention contemplates a housing 25 that is configured to encapsulate or contain the axle 21. Preferably, the axle 21 is supported within the axle passageway 26 extending through the entire length of the housing 25, by way of a pair of bearing elements 27 at the opposite ends of the housing. Preferably, the bearing elements are friction-reducing bushings, although bearing assemblies are also contemplated. The axle 21, sprocket 19 and other rotating components (to be described below) can be held in place by the mounting hubs 22 so that the housing 25 forms a self-contained unit. The housing 25 and associated components can then be easily manipulated and mounted to the front rail FR of the container C.

Figure 2:
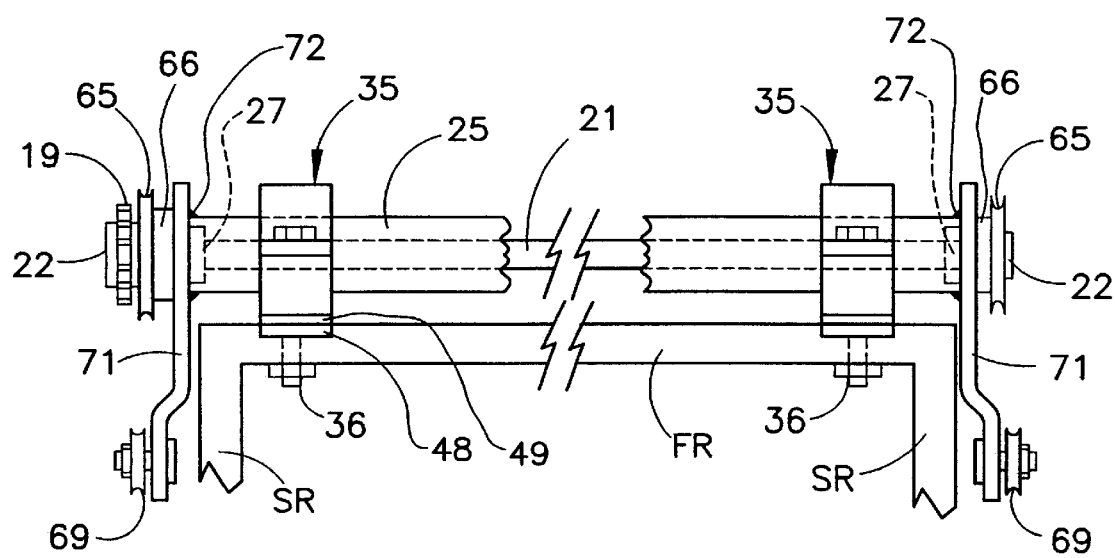
FIG. 2 is a top elevational view of components at the drive end of an extension system in accordance with one embodiment of the present invention.

In order to facilitate this simplified mounting capability, the housing 25 is formed in a D-shaped so that it includes a curved portion 29 and a base portion 30. The D-shaped of the housing 25 allows the housing to resist rotation as the axle 21 rotates within the passageway 26. In one aspect of the invention, the D-shaped housing 25 can be mounted to the front rail FR of the container C by way of a number of mounting clamps 35 as depicted in FIG. 2. At least two such clamps can be utilized to engage the opposite ends of the housing 25 to the front rail FR.

As depicted in the enlarged view of FIG. 4, the mounting clamps 35 include a base clamp half 38 and upper clamp half 40. The base clamp half defines a substantially rectangular channel 39 that corresponds to the shape of the base portion 30 of the housing 25. Similarly, the upper clamp half 40 defines a curved channel 41 that corresponds to the shape of the curved portion 29 of the housing. The two clamp halves can be connected by way of a number of bolts 45 that extend through bores 46 defined in each of the clamp halves. Most preferably, the bores 46 in the lower clamp half 38 are internally threaded to mate with the threaded bolts 45. The bolts 45 are depicted in FIGS. 2 and 4 with the bolt heads on the surface of the clamp half 40. Most preferably, the bolt heads are recessed within the surface of the clamp half, so the bores 46 defined through the upper clamp half 40 can be appropriately configured.

As shown in FIG. 2, the mounting clamps 35, and most particularly the lower clamp halve 38, is mounted to the front rail FR by way of a member of mounting bolts 36. In one preferred embodiment, the mounting bolts 36 extend through recessed bores 43 at the base of the channel 39 in the lower clamp half 38.

It can be appreciated from this description of the mounting clamps 35 that the clamps in the housing provide a very simple and efficient way for mounting the forward components of a tarp extension system, such as the extension system 10 of the present invention. A number of lower clamp halves 38 can be positioned on the front rail FR with a lip 48 overhanging the rail, as shown in FIG. 2. The housing 25 can include a flange 49 that projects upward from the rail, while the body of the lower clamp halve 38 is flush with a front panel of the container C. The mounting bolt holes 43 can be used as a template for drilling holes to receive the mounting bolts 36.

Several of the lower clamp halves 38 can be attached to the container across the width of the front rail FR. The lip 48 provides assurance that the rectangular channels 39 in each of the clamp halves 38 will be accurately aligned so that the housing 25 can be placed within each of the lower clamp halves. Preferably, the depth of the rectangular channel 39 in each of the lower clamp halves 38 is sufficient so that the base portion 30 of the housing 25 is full contained within the channel. In this orientation, the housing 25 can be easily held in place within the successive lower clamp halves 38 while the each successive upper clamp half 40 is attached to a corresponding lower clamp half. Once each of the upper clamp halves 40 have been bolted onto a corresponding lower halve, the housing 25 is solidly mounted to the container body C. At that point, the drive mechanism 12, and particularly the drive chain 16 and handle 17 (where a manual actuation mechanism is utilized), can then be mounted to the container.

In one aspect of the mounting clamps 35, the flange 49 provides a mounting surface for other components. In one embodiment, the flange 49 can be used to anchor the forward end of the tarp cover T. In this instance, the flange 49 can act as a substitute for the securing strip in the system depicted in the '408 patent. Instead, or perhaps in addition to, the flange 49 can be used to mount a wind deflector used to deflect air over the top of the tarp cover T, or a number of other components related or unrelated to the tarp cover system.

Referring now to FIG. 5, an alternative embodiment of the housing for the axle 21 is depicted. In particular, the modified housing 50 defines a channel 51 to receive the axle therethrough. The housing also is generally D-shaped so that it includes a curved portion 53 and a base portion 54. In contrast to the housing 25 shown in FIG. 3, the housing 50 is configured to be mounted directly to the container C without the need for the mounting clamps 35. Thus, the base portion 54 can define a T-slot 56 along its length. The T-slot is sized to receive the head of a bolt 36 therein. Most preferably, the head of the bolt is hexagonal so that the sides of the T-slot 56 prevent rotation of the bolt as a nut is tightened onto the threads of the bolt.

One benefit of the modified housing 50 shown in FIG. 5 is that no additional clamp hardware is necessary. A further advantage is that the continuous slot 56 allows essentially infinitely variable positioning of the mounting bolts 36 for engaging the housing 50 to the front panel of the container body C.

In addition to the T-slot 56, the housing 50 can include a second T-slot 57 on an upward facing surface of the housing. This T-slot 57 can receive a number of bolts 59 similar to the bolts 36. These additional bolts 59 can be used to engage the forward edge of a tarp cover T, as depicted in FIG. 5, or can engage a mounting tube that fits within a transverse pocket at the end of the tarp cover. Alternatively, the bolts can be used to attach a wind deflector or other accessory.

Returning to FIG. 2, further details of the extension system and drive mechanism 12 can be described. In a manner similar to the drive mechanism described in '408 patent, the mechanism can include a pair of drive pulleys 65 at opposite ends of the drive axle 21. Each of the drive pulleys 65 can be fixed to rotate with the axle 21. A bushing 66 can be provided between the drive pulleys 65 and the ends of the housing 25.

Figure 6:
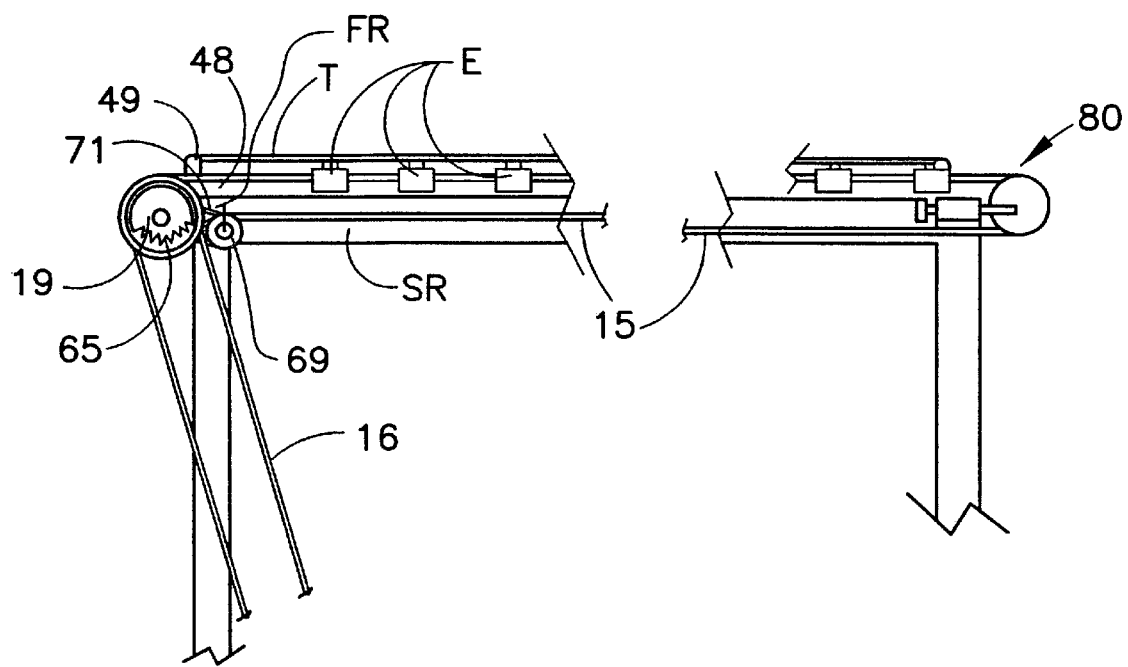
FIG. 6 is a side view of the endless cable mechanism forming part of the extension system of the present invention.

In a further feature of the invention, the endless cable mechanism 14 contemplates the addition of idler pulleys 69 at the front end of the container C. As illustrated in FIG. 6, a rear idler assembly 80 is provided so that the endless cable 15 is threaded between the drive pulley 65, through a front idler pulley 69 and around a pulley in the rear idler assembly 80. As seen best in FIGS. 2 and 5, the front idler pulley 69 is associated with the drive pulley 65 through an idler bracket 71. The idler bracket 71 preferably is welded to the housing 25 at a continuous weld bead 72 (see FIG. 2).

Most preferably, the idler bracket 71 defines a D-shaped cutout 73 that exactly corresponds to the D-shaped profile of the housing 25. Thus, the bracket 71 can be threaded over the end of the housing 25 and subsequently fixed in place, preferably by the weld bead 72 just described. As shown in FIG. 3 and FIG. 6, the idler bracket 71 provides a mounting bore 74 for the front idler pulley 69. This bore 74 is offset at an angle a relative to the centerline of the housing 25 and ultimately to the drive axle 21. In addition, the idler pulley 69 has a smaller diameter than the drive pulley 65. Most preferably, the idler pulley 69 has the same diameter as a rear idler pulley 81 (see FIG. 7) in the rear idler assembly 80. In this way, the maximum mechanical advantage is obtained by a larger drive pulley 65, while allowing the upper and lower segments of the endless cable 15 to run substantially parallel to each other along the length of the container C.

Moreover, the smaller diameter of the idler pulleys 69, 81 allows the upper drive portion of the cable to be relatively close to the lower return portion of the cable, thereby minimizing the exposure of the endless cable system adjacent the side rail SR of the container C. As depicted in the top view of FIG. 2, the idler bracket the idler bracket 71 includes a slight bend adjacent the idler pulley so that the idler pulley 69 can be aligned laterally the drive pulley 65.

Figure 7:
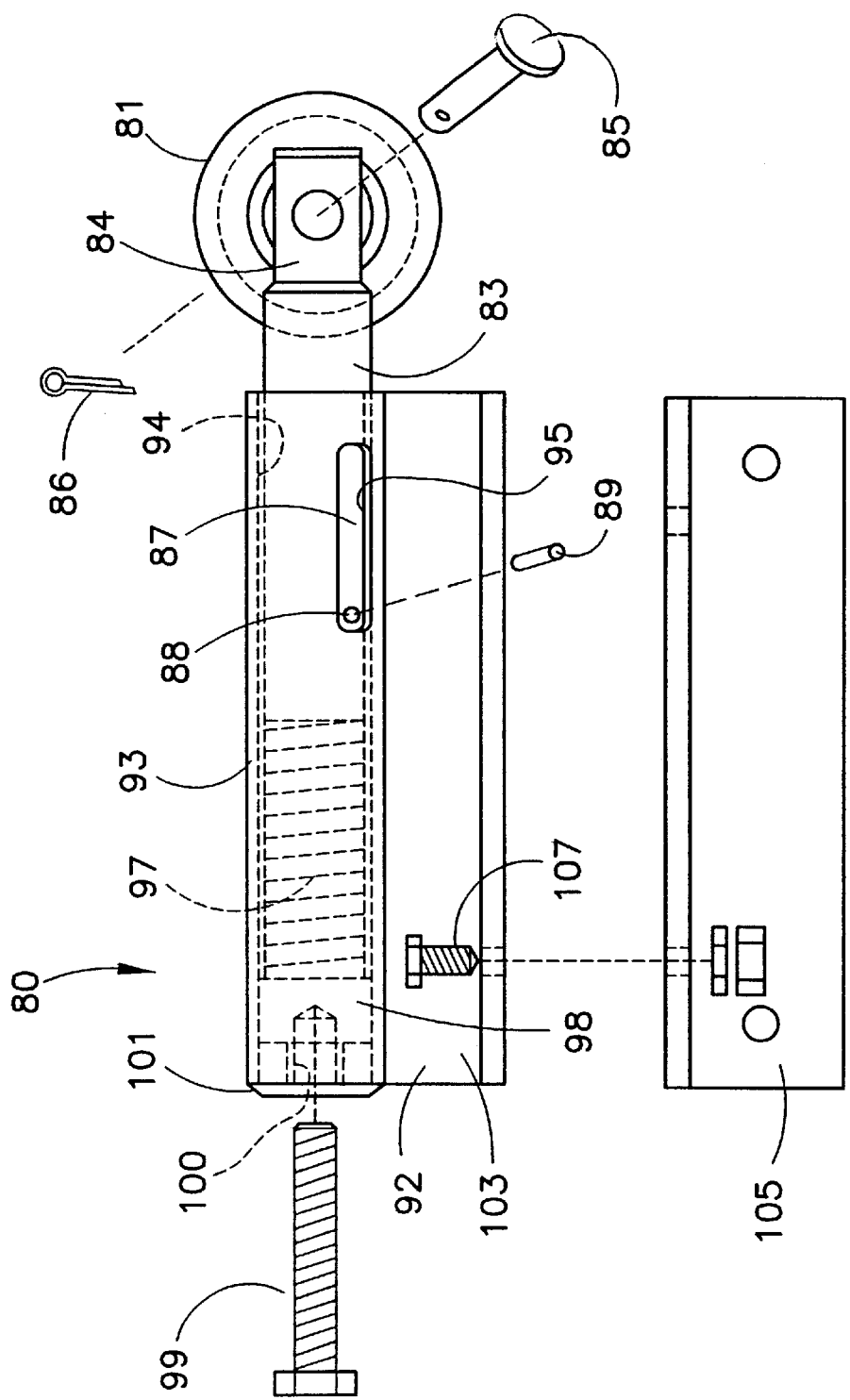
FIG. 7 is a side, partially-exploded view of a tensioning idler assembly in accordance with another aspect of the present invention.

Referring now to FIG. 7, details of the rear idler assembly 80 can be discerned. The endless cable 15 can tend to stretch over time, or as a result of momentary loads. As the cable stretches, the amount of drive force that can be transferred to circulation of the cable is reduced as the frictional engagement between the cable and drive pulleys 65 decreases. If the cable stretches enough, it may even slip off any one of the pulleys 65 or 69. Thus, the present invention contemplates a rear idler assembly that applies a continuous force to the endless cable to keep the cable properly tensioned, even as it stretches over time.

In accordance with one embodiment of the invention, a yoke 83 supports an idler pulley 81. The yoke includes a pair of arms 84 with the pulley disposed between the arms. A pivot pin 85 can pass through appropriately aligned bores in the arms 84 and the idler pulley 81. A cotter pin 86 or other suitable fastener can be used to hold the pulley on the yoke 83.

Extending from the arms 84 is an elongated yoke body 87. Preferably, the body is substantially cylindrical in shape. At one end of the body is a set screw bore 88 to receive a set screw 89, as shown in FIG. 7. The rear idler assembly 80 also includes a mounting body 92 that is configured to be mounted to the container C and preferably to a side rail SR. In the illustrated embodiment, the mounting body 92 includes a hollow cylindrical portion 93 that is sized to slidingly or telescopically receive the yoke body 87 therein. As shown in FIG. 7, when the yoke body 87 is situated within the cylindrical body 93, the set screw 89 can be engaged in the set screw bore 88 by first passing through a slot 95 in the cylindrical portion 93 of the mounting body 92. The length of the slot determines the limits of travel of the yoke 83 relative to the mounting body 92. Preferably, the slot has a length sufficient to account for a normal range of stretching of the endless cable 15.

In addition, in another feature of the invention, the slot 95 has a width that is significantly greater than the diameter of the set screw 89. In a specific embodiment, the slot width is approximately twice as wide as the diameter of the set screw. With this configuration, the yoke 83 is allowed to rotate about its axis relative to the mounting body 92. This degree of limited rotation allows the idler pulley 81 to also rotate in response to occasional side forces generated by uneven extension of the cover tarp T and bows B. Thus, this additional degree of freedom helps keep the tarp bows B from binding as the tarp is extended or retracted along the length of the container C.

As an alternative, the location of the slot and set screw can be reversed. In other words, the yoke body 87 can be configured with a slot extending along a portion of its length. In a preferred embodiment, the yoke body is a cast piece with the slot formed as an elongated indentation in the outer surface of the body. The hollow cylindrical portion 93 of the mounting body 92 can be configured with a threaded bore, rather than the slot shown in FIG. 7. The threaded bore can be positioned near the end of the cylindrical portion 93 and can be configured to accept the threaded set screw 89. The combination of indented slot and set screw in this alternative embodiment functions in the same manner as the slot and set screw configuration of FIG. 7 described above.

The rear idler assembly 80 further includes a tension adjustment spring 97 concentrically disposed within the cylindrical portion 93 of the mounting body 92. One end of this spring 97 directly contacts an end of the yoke body 87. The spring is trapped within the mounting body by way of a plunger 98 that is itself slidably disposed within the cylindrical portion. The plunger 98 and tension spring 97 are trapped within the mounting body 92 by a cap 101 closing an open end of the cylindrical portion 93. The cap 101 can be fastened to the cylindrical portion 93 in conventional manner, such as by welding, threading or by engagement with a set of set screws.

The cap 101 defines a threaded bore 100 through, which extends an adjustment set 99. The end of the adjustment screw bears directly against the plunger 98 or against an indented bearing surface formed in the end of the plunger. This adjustment screw 99 can then adjust the position of the spring 97, and the compression of that spring, within the mounting body 92. When endless cable 15 is engaged around the rear idler pulley 81, the cable exerts a force on the yoke 83 tending to push the yoke deeper into the mounting body 92. This force is resisted by the tension spring 97. The amount of resistance offered by the spring, as well as the depth to which the yoke body 87 extends into the mounting body, is determined by the position of the plunger 98, which is itself established by way of the adjustment screw 99.

The mounting body 92 can include a mounting plate 103 attached to the cylindrical portion 93. A mounting bracket 105 can be provided that can be fastened to the container C or the side rail SR. A number of mounting bolts 107 can then be used to fasten the mounting plate 103 to the mounting bracket 105, thereby completing the assembly of the rear idler assembly 80 on the container body C.

In its further aspect of the inventive tarp extension system, an apparatus is provided to prevent the tarp bows from "sailing". In other words, under high wind conditions or travel over rough roads, the tarp cover T can tend to flap. In addition, the tarp bows B can "sail" or bounce up and down relative to the container body C. This action places the endless cable 15 under significant stress, sometimes severing the cable, but at a minimum unduly stretching the cable. Moreover, as the tarp sails, the container contents may spill or may be exposed to the outside elements. Thus, the present invention contemplates an anti-sail apparatus 110 that can be readily mounted to the bow ends E of the tarping system.

Figure 8:
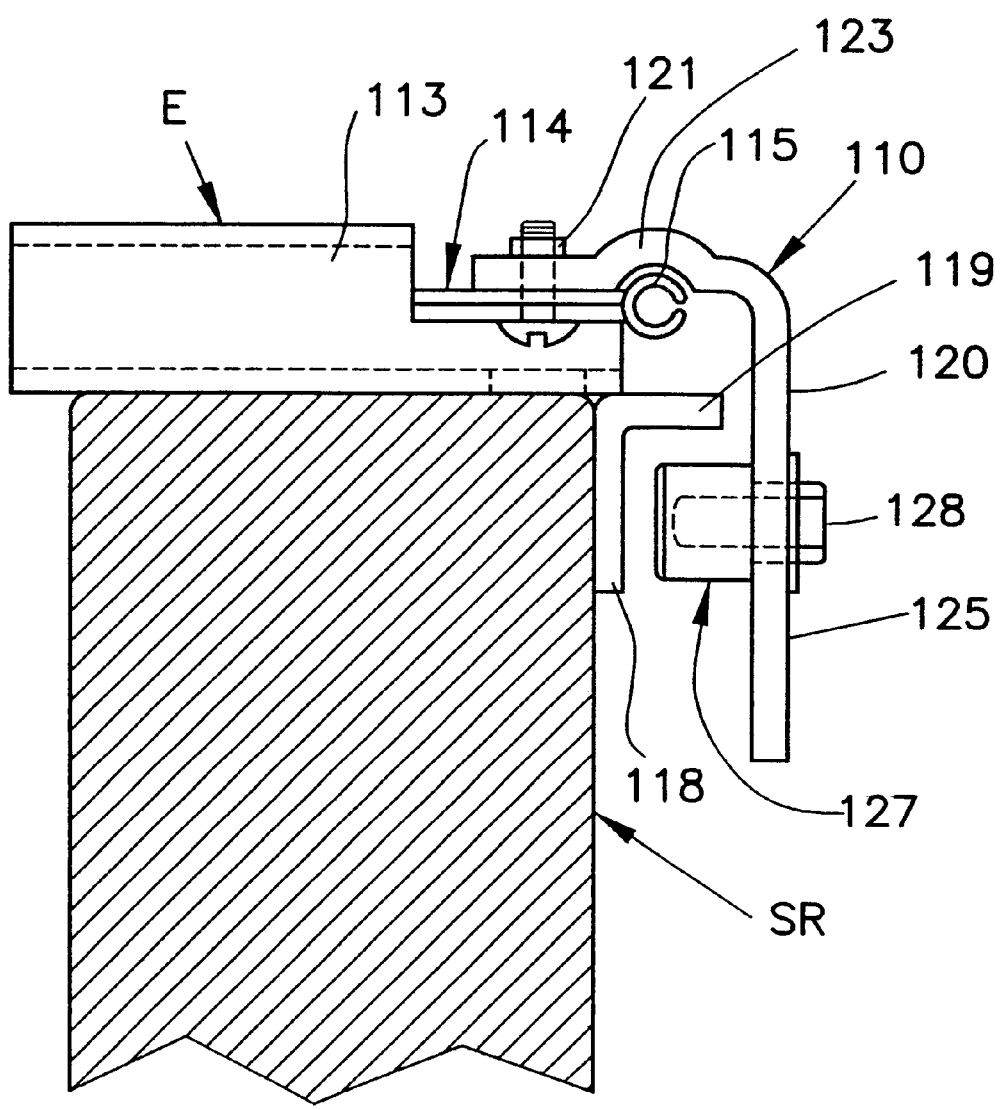
FIG. 8 is a rear partial cross-sectional view an anti-sail assembly aspect of the present invention.

As depicted in FIG. 8, the bow end E can include a glide tube 113 that is configured to slide along the top of the side rail SR as the tarp cover is deployed or retracted. A bow end plate 114 is provided that it forms part of the bow B supporting the tarp cover T. The ends of the bow end plate 114 defines a sleeve 115 through which the endless cable 15 passes. As shown in FIG. 1, several of these bows B, and therefore bow end plates 114, are situated in spaced apart arrangement along the length of the tarp. When the tarp cover is stowed, the bow end plates 114 and sleeves 115 are essentially adjacent each other as the tarp cover is folded onto its self. However, when the tarp is extended, the rear-most bow, which is attached to the cable 15, travels along the length of the container C. The other tarp bows B, and more particularly the corresponding sleeves 115, slide along the cable 115 until the tarp is fully extended.

In accordance with one aspect of the invention, an anti-sail apparatus 110 can be implemented at each bow end B, and more specifically each bow end plate 114. Thus, as shown in FIG. 8, an anti-sail bracket 120 can be mounted to the bow end plate 114 by way of a mounting bolt 112. In a specific embodiment, the bracket 120 includes a dimple 123 that conforms to the outer surface of the sleeve 115 in each bow end plate. In this way, the bracket 120 is prevented from rotating about the mounting bolt 121 and thereby comprising the operation of the anti-sail apparatus 110.

The anti-sail bracket 120 also includes a vertical arm 125 that projects downward essentially parallel to the sidewall of container C from the side rail SR. The vertical arm includes a glide post 127 that projects substantially perpendicularly from the arm and inward toward the side rail SR. A fastener 128 can be utilized to mount the glide post 127 to the arm 125. The fastener 128 can be configured to allow the glide post 127 to rotate about the fastener to allow the post to operate more smoothly in the manner described below.

In one specific embodiment, a rail member 118 is affixed along the entire length of the side rail SR. The rail is preferably in the form of a right angle, elongated bar. In addition, the glide tube 113 can establish the position of the rail 118. In an alternative embodiment, the glide tube 113 can be configured to include a similar rail feature. However, in the most preferred embodiment, a separate rail can be mounted along the entire length of each side of the container C. A shown in FIG. 8, the rail 118 includes an outwardly projecting ledge 119. The glide post 127 is disposed beneath the ledge 119. More specifically, the ledge 119 is situated between the glide post 127 and the bow end plate 114 and sleeve 115. Thus, if the bow end E exerts any upward force, this upward force will cause the anti-sail bracket 120 to try to move upward until the glide post 127 contacts the ledge 119 of the rail 118.

Preferably, the gap nominal between the glide post 127 and the ledge 119 is only about 0.25". In this way, a certain amount of movement is permitted, but not enough movement or sailing to comprise the endless cable system. Preferably, the glide post 127 can be formed up a relatively hard plastic material that can withstand the type of impact and sliding movement that it may encounter in this particular application.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. An improvement for a tarping system for an open-topped container, the tarping system having an tarp cover supported by a plurality of bows, at least one end of the bows being carried by at least one endless cable extending from one end of the container to an idler pulley system at the opposite end of the container, the improvement comprising:
    a drive axle;
    at least one drive pulley mounted at one end of said drive axle and configured to be traversed by the endless cable;
    a drive member mounted at one end of said drive axle and configured to engage a drive component for rotating said axle;
    an elongated housing having a length substantially equal to the width of the container at the one end of the container, said housing defining a passageway along said length receiving said drive axle therethrough;
    a bearing element disposed within said passageway configured for rotatably supporting said drive axle therein; and
    means for removably mounting said elongated housing to the one end of the container.

2. The improvement for a tarping system according to claim 1, wherein said means for removably mounting includes:
    a base clamp half defining a channel for receiving at least a portion of said elongated housing therein and having a mounting surface for abutting the container;
    at least one mounting fastener extending through said surface and configured to engage the container;
    an upper clamp half spanning said channel and configured to close said channel with said elongated housing clamped between said base clamp and upper clamp halves; and
    means for removably engaging said upper clamp half to said base clamp half.

3. The improvement for a tarping system according to claim 2, wherein said base clamp half defines at least one hole extending through said channel and through said mounting surface for receiving said at least one mounting fastener therethrough.

4. The improvement for a tarping system according to claim 2, wherein:
    said elongated housing has a D-shaped cross-section; and
    said upper clamp half defines a curved channel to substantially conform to the curved portion of the D-shaped cross section of said elongated housing.

5. The improvement for a tarping system according to claim 1, wherein said means for removably mounting said elongated housing to the container includes:
    a mounting surface extending along the length of said housing;

a T-shaped slot defined in said mounting surface; and at least two mounting fasteners, each having a head configured for sliding engagement within said T-shaped slot, and each of said mounting fasteners configured to engage the container.

6. The improvement for a tarping system according to claim 5, wherein said elongated housing includes a second T-shaped slot defined in another surface along the length of said housing, said second T-shaped slot configured for sliding engagement with fasteners for mounting a component to said housing.

7. The improvement for a tarping system according to claim 1, wherein said elongated housing includes:

a mounting surface along the length of said housing for abutting a front wall of the container; and a lip extending along the length of said housing substantially perpendicular from said mounting surface for abutting an upper edge of the front wall of the container.

8. The improvement for a tarping system according to claim 7, wherein said elongated housing further includes a flange projecting substantially perpendicularly from said lip, said flange defining a surface for engaging a component to said housing.

9. The improvement for a tarping system according to claim 1, further comprising at least one idler pulley carried by said elongated housing associated with a corresponding one of said at least one drive pulley and configured to be engaged by the endless cable.

10. The improvement for a tarping system according to claim 9, further comprising at least one idler bracket attached said elongated housing adjacent said at least one drive pulley and supporting a corresponding one of said at least one idler pulley.

11. The improvement for a tarping system according to claim 10, wherein:

said elongated housing defines an outer shape; and said at least one idler bracket defines an opening therethrough corresponding to said outer shape so that at least a portion of said elongated housing extends through said opening.

12. The improvement for a tarping system according to claim 9, wherein said at least one drive pulley has a drive diameter and said at least one idler pulley has a smaller idler diameter.

13. The improvement for a tarping system according to claim 11, further comprising at least one idler bracket attached to said elongated housing adjacent said at least one drive pulley, said at least one idler bracket supporting a corresponding one of said at least one idler pulley at a position relative to a corresponding one of said at least one drive pulley so that the portion of the endless cable exiting an idler pulley is substantially parallel to the portion of the endless cable exiting the drive pulley.

* * * * *